United States Patent
Nimbavikar et al.

(10) Patent No.: US 12,231,948 B2
(45) Date of Patent: *Feb. 18, 2025

(54) INTELLIGENT ALLOCATION OF NETWORK RESOURCES

(71) Applicant: T-Mobile USA, Inc., Bellevue, WA (US)

(72) Inventors: Gunjan Nimbavikar, Sammamish, WA (US); Hsin Fu Henry Chiang, Bellevue, WA (US); Ming Shan Kwok, Seattle, WA (US); Shujaur Mufti, Snoqualmie, WA (US); Suresh Thanneeru, Redmond, WA (US); Wafik Abdel Shahid, Kenmore, WA (US); Zeeshan Jahangir, Snoqualmie, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 186 days.

This patent is subject to a terminal disclaimer.

(21) Appl. No.: 18/047,567

(22) Filed: Oct. 18, 2022

(65) Prior Publication Data

US 2023/0060074 A1    Feb. 23, 2023

Related U.S. Application Data

(63) Continuation of application No. 16/573,964, filed on Sep. 17, 2019, now Pat. No. 11,483,732.

(Continued)

(51) Int. Cl.
H04W 28/02    (2009.01)
H04B 17/318    (2015.01)
(Continued)

(52) U.S. Cl.
CPC ...... *H04W 28/0268* (2013.01); *H04B 17/318* (2015.01); *H04W 28/0289* (2013.01);
(Continued)

(58) Field of Classification Search
CPC . H04W 28/02; H04W 72/1242; H04W 72/10; H04W 28/24; H04W 72/087;
(Continued)

(56) References Cited

U.S. PATENT DOCUMENTS 8,839,317 B1    9/2014    Rieger et al.
9,681,323 B2    6/2017    Horn et al.
(Continued)

OTHER PUBLICATIONS

Office Action for U.S. Appl. No. 16/573,964, mailed on Nov. 29, 2021, Nimbavikar, "Intelligent Allocation of Network Resources", 20 pages.
(Continued)

*Primary Examiner* — Ricky Q Ngo
*Assistant Examiner* — Kabir U Jahangir
(74) *Attorney, Agent, or Firm* — Lee & Hayes, P.C.

(57) ABSTRACT

Systems, devices, and techniques described herein relate to intelligently allocating network resources to Quality of Service (QoS)-sensitive data traffic. An example method includes identifying a request to deliver QoS-sensitive services to a User Equipment (UE) over at least one delivery network. The at least one delivery network may include at least one reserved resource and at least one pooled resource. The QoS-sensitive services are determined to be delivered over the at least one pooled resource. In addition, delivery of the QoS-sensitive services is caused over the at least one pooled resource.

20 Claims, 5 Drawing Sheets

Related U.S. Application Data

(60) Provisional application No. 62/742,256, filed on Oct. 5, 2018.

(51) Int. Cl.
*H04W 28/24* (2009.01)
*H04W 72/56* (2023.01)
*H04W 72/566* (2023.01)

(52) U.S. Cl.
CPC ........... *H04W 28/24* (2013.01); *H04W 72/56* (2023.01); *H04W 72/569* (2023.01)

(58) Field of Classification Search
CPC .. H04W 72/0486; H04B 17/318; H04L 47/10; H04L 47/805
See application file for complete search history.

(56) References Cited

U.S. PATENT DOCUMENTS

| | | | |
|---|---|---|---|
| 10,091,784 B1 * | 10/2018 | Liu | H04J 11/00 |
| 10,244,546 B2 * | 3/2019 | Hareuveni | H04W 24/08 |
| 11,178,569 B2 | 11/2021 | Mok et al. | |
| 2009/0163223 A1 | 6/2009 | Casey | |
| 2010/0067400 A1 | 3/2010 | Dolganow et al. | |
| 2012/0094629 A1 | 4/2012 | Liu et al. | |
| 2014/0066084 A1 | 3/2014 | Paladugu | |
| 2014/0241321 A1 | 8/2014 | Wong et al. | |
| 2015/0351118 A1 | 12/2015 | Arnott et al. | |
| 2017/0359749 A1 | 12/2017 | Dao | |
| 2018/0063748 A1 | 3/2018 | Ling et al. | |
| 2020/0112872 A1 | 4/2020 | Nimbavikar et al. | |
| 2020/0280871 A1 | 9/2020 | Khirallah et al. | |
| 2020/0389910 A1 * | 12/2020 | Li | H04W 72/0446 |

OTHER PUBLICATIONS

Office Action for U.S. Appl. No. 16/573,964, mailed on Mar. 3, 2022, Nimbavikar, "Intelligent Allocation of Network Resources", 12 pages.

Office Action ofr U.S. Appl. No. 16/573,964, mailed on May 14, 2021, Nimbavikar, , Intelligent Allocation of Network Resources, 17 pages.

PCT Search Report and Written Opinion mailed in Jan. 15, 2020 for PCT Application No. PCT/US2019/053443, 10 pages.

* cited by examiner

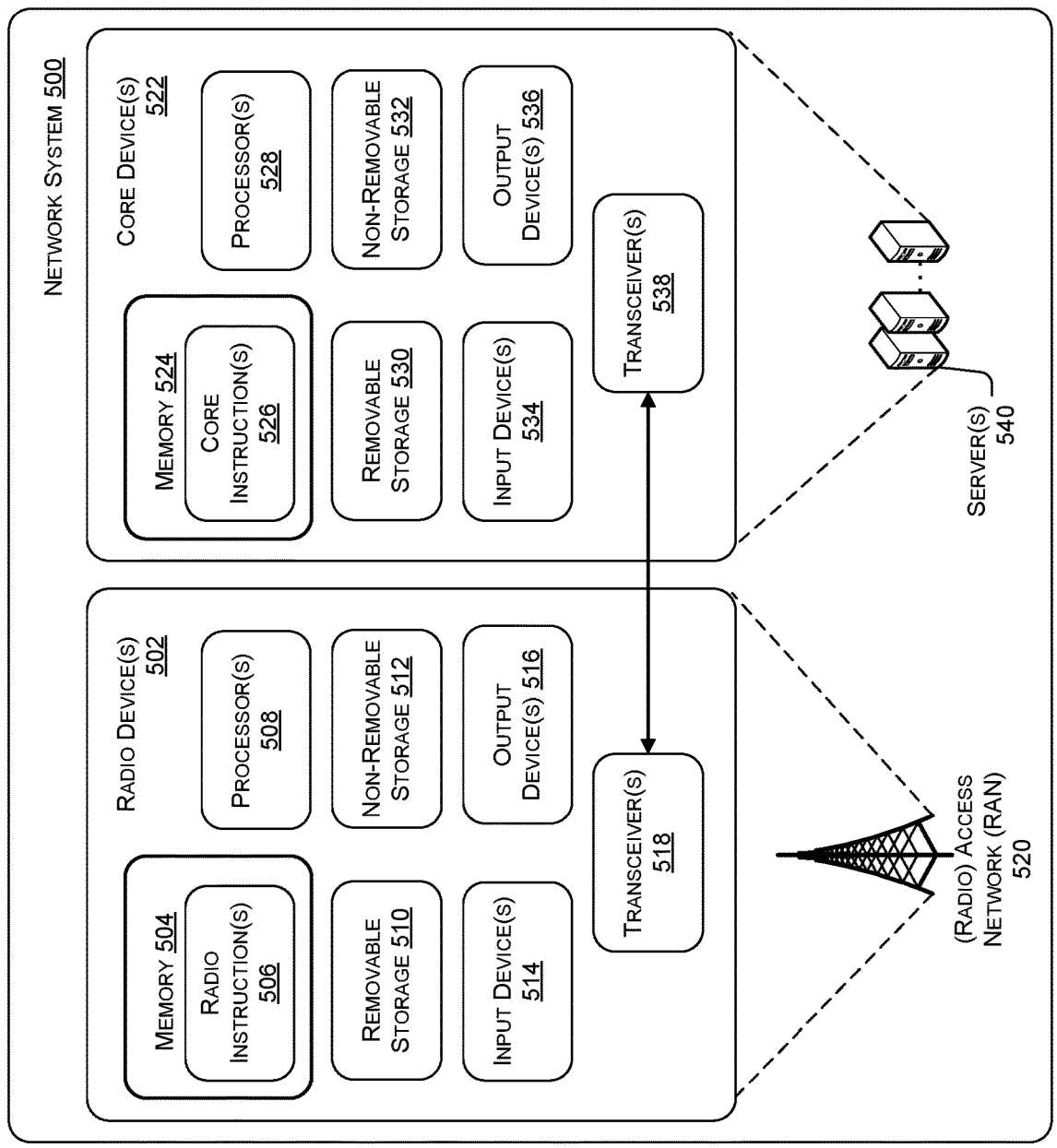

INTELLIGENT ALLOCATION OF NETWORK RESOURCES

CROSS-REFERENCE TO RELATED APPLICATION

This application is a continuation of and claims priority to commonly assigned, co-pending U.S. patent application Ser. No. 16/573,964, filed Sep. 17, 2019, which claims priority to U.S. Provisional Application No. 62/742,256, filed on Oct. 5, 2018. Application Ser. No. 16/573,964 and 62/742,256 are fully incorporated herein by reference in their entirety.

BACKGROUND

Modern terrestrial telecommunication systems include heterogeneous mixtures of $2^{nd}$, $3^{rd}$ and $4^{th}$ generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UNITS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include $5^{th}$ generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates example devices configured to intelligently allocate services to at least one reserved resource and/or at least one pooled resource in one or more delivery networks.

DETAILED DESCRIPTION

Figure 1:
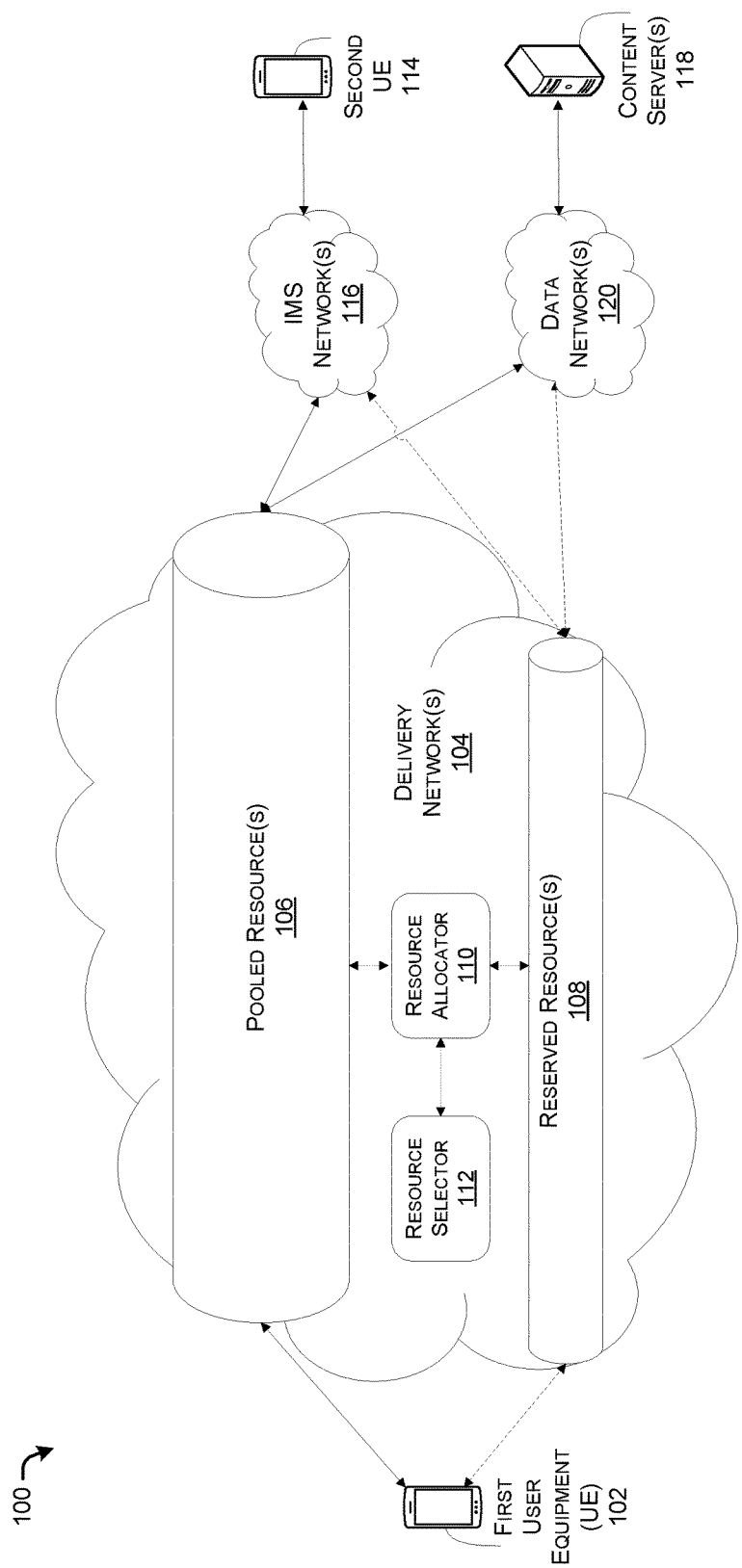
FIG. 1 illustrates an example environment for intelligent allocation of network resources.

The systems, devices, and techniques described herein relate to selectively enabling delivery of Quality of Service (QoS)-sensitive services over pooled resources.

Various delivery networks are designed to deliver services from a source to a destination over pooled resources. A "network resource," and its equivalents, may refer to at least one of an available bandwidth, a resource block, a processing resource, a memory resource, a routing resource, bandwidth, or the like utilized by at least one node and/or at least one interface in the network to process and/or transmit data through the network. As used herein, the terms "pooled resources," "pooled network resources," "shared network resources," or their equivalents, can refer to network resources are shared by various types of data traffic. For example, pooled resources may correspond to a default bearer or a default data flow over which a variety of different types of data can be transmitted end-to-end across at least one delivery network.

However, delivery networks may be designed to selectively deliver some QoS-sensitive services over reserved resources, rather than pooled resources. As used herein, the term "QoS-sensitive" can refer to a type of services that is relatively sensitive to delays and/or missed packets during network delivery. In various implementations, carriers and other organizations define various levels of QoS-sensitive services corresponding to customer expectations. In some examples, a type of QoS-sensitive services may be associated with a Guaranteed Bit Rate (GBR). In some instances, a type of QoS-sensitive services may be associated with a QoS Class Identifier (QCI), a $5^{th}$ Generation (5G) QoS Indicator (5QI), or the like.

As used herein, the term "reserved resources," "reserved network resources," and their equivalents, can refer to one or more network resources that are at least partially reserved for a type of data traffic. A network may reserve network resources to ensure that a data flow carrying a particular type of services can be delivered through the network at a particular QoS level or GBR associated with the particular type of services. For example, reserved resources may correspond to a dedicated bearer over which data can be transmitted end-to-end across at least one delivery network. In some examples, a delivery network may deliver data in a 5G QoS Flow (5QF) via reserved resources.

In some cases, however, delivery over reserved resources may be associated with a lower apparent QoS than delivery over pooled resources. For instance, a particular reserved resource in a delivery network may be experiencing a significant level of congestion, whereas pooled resources in the delivery network may be experiencing limited or no congestion. If a delivery network delivers QoS-sensitive services over the particular reserved resource, the services may be delivered with a lower QoS than if the delivery network would have delivered the QoS-sensitive services over the pooled resources.

In some instances, a delivery network may not have reserved resources available. In some examples, the delivery network may lack functionality that would enable it to reserve resources. Accordingly, when the delivery network receives a request to deliver QoS-sensitive services, the delivery network may refrain from delivering the QoS-sensitive services altogether.

According to various implementations of the present disclosure, a delivery network may selectively deliver QoS-sensitive services over pooled resources. In some cases, at least one node in the delivery network may intelligently determine whether to deliver the QoS-sensitive services over pooled resources in response to identifying one or more factors associated with the delivery network, an entity to which the QoS-sensitive services are delivered, the QoS-sensitive services themselves, or the like. For instance, the delivery network may deliver QoS-sensitive services over pooled resources when reserved resources are significantly congested and the pooled resources are relatively uncongested.

In some implementations, the delivery network may selectively deliver QoS-sensitive services over pooled resources, when they are delivered to an entity that is unsubscribed to the delivery network and/or a carrier of the delivery network. Accordingly, the delivery network may be more likely to ensure that reserved resources are available for subscribers to the delivery network.

In some examples, the delivery network may deliver the QoS-sensitive services over pooled resources when the QoS-sensitive services are not emergency services. For instance, the delivery network may refrain from using pooled resources to deliver Enhanced 911 (E911) services.

Various implementations are directed to specific improvements to the technical field of telecommunications. For instance, by delivering QoS-sensitive services over pooled resources, delivery networks that do not support reserved resources may nevertheless be able to support the QoS-sensitive services. In addition, various implementations can be used to intelligently allocate reserved and pooled resources, so that an available capacity of a delivery network can be maximized in a manner responsive to real-time conditions of the delivery network.

Some example implementations will now be described with reference to the accompanying figures.

FIG. 1 illustrates an example environment 100 for intelligent allocation of network resources.

The environment 100 may include a first User Equipment (UE) 102. As used herein, the terms "UE," "user device," "wireless communication device," "wireless device," "communication device," "mobile device," "client device," and "terminal" can be used interchangeably herein to describe any UE (e.g., the first UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, the first UE 102 can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

In various implementations, the first UE 102 may be connected to at least one delivery network 104. The delivery network(s) 104 may include at least one Radio Access Network (RAN) connected to the first UE 102 via one or more wireless interfaces. The RAN(s) may include at least one of a 3GPP RAN, such a GSM/EDGE RAN (GERAN), a Universal Terrestrial RAN (UTRAN), or an Evolved UTRAN (E-UTRAN), a 5G UTRAN, or alternatively, via a "non-3GPP" RAN, such as a Wi-Fi RAN, or another type of wireless local area network (WLAN) that is based on the IEEE 802.11 standards. In some instances, the RAN can include a Wi-Fi Access Point (AP). In some cases, the RAN can include an eNodeB, a gNodeB, or a combination thereof. Although not illustrated, the environment 100 can further include any number and type of base stations representing any number and type of macrocells, microcells, picocells, or femtocells, for example, with any type or amount of overlapping coverage or mutually exclusive coverage compared to the RAN(s).

In various implementations, the delivery network(s) 104 may include at least one core network connected to the RAN(s). The core network(s) may include a $2^{nd}$ Generation (2G) core network, a $3^{rd}$ Generation (3G) core network, $4^{th}$ Generation (4G) core network, a $5^{th}$ Generation (5G) core network, or a combination thereof. In certain instances, various components of a 4G core network, such as an Evolved Packet Core (EPC), can include, but are not limited to, a Mobility Management Entity (MME), a Serving Gateway (SGW), a Packet Data Network (PDN) Gateway (PGW), a Home Subscriber Server (HSS), an Access Network Discovery and Selection Function (ANDSF), and/or an evolved Packet Data Gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C). The EPC may further include a Policy and Charging Rules Function (PCRF). Each entity, gateway, server, and function in the 4G core network can be implemented by specialized hardware (e.g., one or more devices), general hardware executing specialized software (e.g., at least one virtual machine executed on one or more devices), or the like.

In various examples, the delivery network(s) 104 include a 5G core network. In some examples, various components of a 5G core network can include, but are not limited to, a Network Exposure Function (NEF), a Network Resource Function (NRF), an Authentication Server Function (AUSF), an Access and Mobility management Function (AMF), a Policy Control Function (PCF), a Session Management Function (SMF), a Unified Data Management (UDM) function, a User Plane Function (UPF), and/or an Application Function (AF). Each entity, gateway, server, and function in the 5G core network can be implemented by specialized hardware (e.g., one or more devices), general hardware executing specialized software (e.g., at least one virtual machine executed on one or more devices), or the like.

In general, the NEF can be implemented as a network function including functionality to securely expose services and/or capabilities provided by and amongst the various network functions, as discussed herein. In some instances, the NEF receives information from other network functions in the 5G core and can store the received information as structured data using an interface to a data storage network function.

In general, the AUSF can be implemented as a network function including functionality to provide authentication to various devices in the network. For example, the AUSF can request device credentials (e.g., security key(s)), verify that the first UE 102 is authorized to connect to a network, and/or control access to the network based on the device credentials.

In general, the NRF can be implemented as a network function including functionality to support service discovery (e.g., receive a network function discovery request and provide information associated with the discovered network function instances to a requesting entity). In some instances, the NRF can receive utilization information, capability information, etc. from various network functions, such as the UPF, to provide such utilization information to the other components discussed herein. Further, the NRF can select, assign, implement, or otherwise determine network functions to be used in a network based at least in part on utilization information, as discussed herein.

In general, the AMF can be implemented as a network function including functionality to provide UE-based authentication, authorization, mobility management, etc., to various UEs. In some instances, the AMF can include functionality to terminate a RAN control plane interface between the first UE 102 and other functions on the delivery network(s) 104. In some instances, the AMF can include functionality to perform registration management of the first UE 102 in the RAN(s) and/or 5G core network, connection management, reachability management, mobility management, access authentication, access authorization, security anchor functionality (e.g., receiving and/or transmitting security keys during registration/authorization), and the like.

In general, the PCF can be implemented as a network function including functionality to support unified policy framework to govern network behavior, provide policy rules to control plane functions and/or enforce such rules, and/or implement a front end to access subscription information relevant for policy decisions in a data repository.

In general, the SMF can be implemented as a network function including functionality to manage communication sessions by and between UEs, and/or to provide IP addresses to the UEs. In some instances, the SMF can select a UPF to provide services to the first UE 102 in response to receiving a request for services from the first UE 102.

In general, the UDM can be implemented as a network function including functionality to process authentication credentials, handle user identification processing, manage registration and/or mobility, manage subscriptions between the first UE 102 and a carrier, and/or manage Short Message Service (SMS) data.

In general, the UPF can be implemented as a network function including functionality to control data transfer between the first UE 102 and the various components of the environment 100. In some instances, the UPF can include functionality to act as an anchor point for radio access technology (RAT) handover (e.g., inter and intra), external protocol data unit (PDU) session point of interconnect to an external network (e.g., the Internet), packet routing and forwarding, packet inspection and user plane portion of policy rule enforcement, traffic usage reporting, traffic routing, QoS handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs, which are associated with the delivery network(s) 104 and/or with the first UE 102.

In general, the AF can be implemented as a network function including functionality to route traffic to/from applications operating on the network, facilitate accessing the NEF, and interact with the policy framework for policy control in connection with the PCF.

In some implementations, the delivery network(s) 104 may include a Circuit Switched (CS) network. For instance, the delivery network(s) 104 may include at least one of a $2^{nd}$ Generation (2G) core network, a $3^{rd}$ Generation (3G) core network, or the like.

The delivery network(s) 104 may include one or more pooled resources 106 by which data can be delivered to and from the first UE 102. In some cases, the pooled resource(s) 106 may include at least one end-to-end pathway through the delivery network(s) 104 that are allocated to various data flows traversing the delivery network(s) 104 on an opportunistic basis. In some cases in which the delivery network(s) 104 include a RAN, the pooled resource(s) 106 may include one or more wireless interfaces that can be used to transmit data between the RAN and various UEs including the first UE 102. In some cases in which the delivery network(s) 104 include an EPC, the pooled resource(s) 106 may include at least one resource of an SGW and/or at least one resource of a PGW, wherein the resource(s) are opportunistically shared by multiple data flows traversing the delivery network(s) 104. In some cases in which the delivery network(s) 104 include a 5G core network, the pooled resource(s) 106 may include at least one resource of a UPF that is opportunistically shared by multiple data flows traversing the delivery network(s) 104. For instance, a default bearer or default 5QI data flow may be examples of pooled resource(s) 106.

The delivery network(s) 104 may additionally include one or more reserved resources 108 by which data can be delivered to and from the first UE 102. In some cases, the reserved resource(s) 108 may include at least one end-to-end pathway through the delivery network(s) 104 that is allocated to a limited number or type of data flows traversing the delivery network(s) 104. In some cases in which the delivery network(s) 104 include a RAN, the reserved resource(s) 108 may include one or more wireless interfaces that can be used to transmit data between the RAN and various UEs including the first UE 102. In some cases in which the delivery network(s) 104 include an EPC, the reserved resource(s) 108 may include at least one resource of an SGW and/or at least one resource of a PGW, wherein the resource(s) may be reserved for a limited number or type of data flows traversing the delivery network(s) 104. In some cases in which the delivery network(s) 104 include a 5G core network, the pooled resource(s) 108 may include at least one resource of a UPF that is reserved for a limited number or type of data flows traversing the delivery network(s) 104. For instance, a dedicated bearer or dedicated 5QI data flow may be examples of reserved resource(s) 108.

A resource allocator 110 may include at least one node in the delivery network(s) 104 configured to allocate data traffic traversing the delivery network(s) 104 to the pooled resource(s) 106 and/or the reserved resource(s) 108. As used herein, the term "node," and its equivalents, can refer to one or more devices that transmit and/or receive data in a network. In some instances, a first node can transmit and/or receive data from a second node. For instance, a UE (e.g., the first UE 102) receiving services from an IMS network (e.g., the IMS network(s) 116) may be a node. In some cases, a UPF (e.g., in the delivery network(s) 104) through which services are exchanged between an IMS network and a UE can also be considered a node. As used herein, the term "interface," and its equivalents, can refer to a connection between two nodes over which data can be transmitted and/or received. Some examples of the resource allocator 110 include at least one of a RAN, an MME, an AMF, or the like.

A resource selector 112 may be included in the delivery network(s) 104. The resource selector 112 may be configured to select the pooled resource(s) 106 and/or the reserved resource(s) 108 for delivery of the data traffic traversing the delivery network(s) 104. In some cases, the resource selector 112 may be configured to identify whether requested services are QoS-sensitive. The resource selector 112 may further monitor various conditions of the delivery network(s) 104, the devices (e.g., the first UE 102) to which the services are being delivered, or the like, in order to select the pooled resource(s) 106 or the reserved resource(s) 108 for each communication session serviced by the delivery network(s) 104. Some examples of the resource selector 112 include at least one of a RAN, an SGW-C, a PGW-C, or a UPF.

In some implementations, the first UE 102 may exchange services with a second UE 114 via the delivery network(s) 104 and one or more Internet Multimedia Subsystem (IMS) networks 116. The IMS network(s) 116 may be referred to at least one "IMS core network," at least one "IMS CN Subsystem," or the like. IMS is an architectural framework defined by the 3rd Generation Partnership Project (3GPP) for delivering IP multimedia to UEs, such as the first UE 102. The IMS network(s) 116 can be maintained and/or operated by one or more service providers, such as one or more wireless carriers (also referred to as "carriers"), that provide IMS-based services to users who are associated with UEs, such as the first UE 102. For example, a service provider can offer multimedia telephony services that allow a user to call or message other users via the IMS network(s) 116 using his/her UE. A user can also utilize an associated UE to receive, provide, or otherwise interact with various different IMS-based services by accessing the IMS network(s) 116. It is to be appreciated that any number of base stations and/or nodes can be included in the IMS network(s) 116.

Accordingly, an operator of the IMS network(s) 116 can offer any type of IMS-based service, such as, telephony services, emergency services (e.g., E911), gaming services, instant messaging services, presence services, video conferencing services, social networking and sharing services, location-based services, push-to-talk services, and so on. In order for a UE (e.g., the first UE 102) to access these services (e.g., telephony services), the UE may be configured to request establishment of a communication session, or another UE (e.g., the second UE 114) may be configured to request establishment of the communication session. In the case of telephony services, the communication session can comprise a voice call (e.g., a voice-based communication session, such as a VoLTE call, or a Wi-Fi call), a video call, or the like. As used herein, the term "services" can refer to at least one type of data being delivered in one or more data flows. A data flow may refer to any transmission of data from a source node to a destination node (which may traverse one or more intermediary nodes) in a communication session.

In various examples, the first UE 102 may exchange services with at least one content server 118 via one or more data networks 120. The content server(s) 118 may include one or more devices configured to store content and to transmit content to one or more destinations over the data network(s) 120. Content may include media content, news content, or any other type of data. The data network(s) 120 may include one or more Wide Area Networks (WANs) over which data can be transmitted. For instance, the data network(s) 120 may include the Internet.

In various implementations, the resource selector 112 may be configured to select the pooled resource(s) 106 and/or the reserved resource(s) 108 for delivery of the services based on a type of the services being delivered. Services can be divided into Quality of Service (QoS)-sensitive services and non-QoS-sensitive services.

In some instances, QoS Class Identifiers (QCIs) can be used to categorize different types of services traversing the delivery network(s) 104. In 5G networks, a QCI may be referred to as a 5G QoS Identifier (5QI). Each QCI (e.g., each 5QI) may be associated with at least one of a service type, a priority, a Packet Error Rate (PER), or a Packet Delay Budget (PDB). A service type may refer to the type of services associated with the QCI. Some example service types with QCIs (e.g., designated by LTE) include conversational voice (QCI 1), conversational video (live streaming) (QCI 2), real time gaming and V2X messages (QCI 3), non-conversational video (buffered streaming) (QCI 4), IMS signaling (QCI 5), video (buffered streaming) TCP-based (QCI 6), and voice/video (live streaming)/interactive gaming (QCI 7). Various 5QIs have been designated for various types of services that can be delivered by 5G networks.

When congestion is encountered at a network node, the node may discard and/or delay data packets associated with relatively low priority levels and continue to transmit data packets associated with relatively high priority levels. For instance, a QCI associated with conversational voice services may have a higher priority than a QCI associated with interactive gaming services. If a UPF is congested and receives a first data packet associated with conversational voice services and a second data packet associated with interactive gaming services, the UPF may prioritize delivery of the first data packet over delivery of the second data packet due to the higher priority of the QCI associated with the conversational voice services.

A PER (also referred to as a "packet error loss rate") of a QCI may correspond to the maximum number of data packets (of a corresponding service type) that can be unsuccessfully delivered via one or more delivery networks over the total number of data packets (of the corresponding service type) that are transmitted through the delivery network(s). The PER of the QCI may correspond to how sensitive the QoS of the corresponding services is to packet errors and/or loss. For instance, a PER of a QCI associated with conversational voice services may be $10^{-2}$, whereas a PER of a QCI associated with IMS signaling services may be $10^{-6}$. Even though the voice services are more sensitive to delays than the IMS signaling services, the IMS signaling services are more sensitive to error loss than the voice services.

A PDB can refer to a maximum delay or latency that a data packet associated with the corresponding services can experience through the delivery network(s) without noticeably affecting QoS. A QCI associated with V2X messages, for example, may have a PDB of 50 ms, whereas a QCI associated with video (buffered streaming) TCP-based may have a PDB of 300 ms.

Some QCI levels may be associated with a Guaranteed Bit Rate (GBR). A GBR can refer to a minimum bit rate at which the corresponding types of services are to be delivered through the delivery network(s). Service types associated with QCIs that have GBRs may be referred to as "GBR services," and service types with QCIs that lack GBRs may be referred to as "non-GBR services." In some cases, a GBR of a QCI can be defined according to the QCI's PER and/or PDB.

According to various implementations, QoS-sensitive services may be defined as having any service type with a QCI associated with at least one of a priority that is above a threshold priority level, a PER lower than a threshold PER, a PDB that is lower than a threshold PDB, or a GBR. In some implementations, QoS-sensitive services may be defined as any services with one of a predetermined set of QCIs (e.g., 5QIs).

Requested services may be identified as QoS-sensitive services or non-QoS-sensitive services by the resource selector 112. For instance, a request for the services (e.g., a SIP INVITE) may identify the type of services being requested (e.g., conversational voice, conversational video, or the like). The request may include one or more data packets received by the delivery network(s) 104. In some cases, the request may identify a QCI of the requested services, or the like. In some cases, the resource selector 112 may refer to a database that stores service types and their respective QCIs, as defined according to one or more policies of the delivery network(s) 104, and may identify the QCI of the requested services by looking up the service type of the requested services in the database. Upon identifying the QCI of the requested services, the resource selector 112 may identify whether to select the reserved resource(s) 108 or pooled resource(s) 106 to deliver the requested services.

As a default, the resource selector 112 may select the reserved resource(s) 108 to deliver QoS-sensitive services and select the pooled resource(s) 106 to deliver the non-QoS-sensitive services. However, the resource selector 112 may select the pooled resource(s) 106 to deliver QoS-sensitive services in some implementations of the present disclosure.

In some instances, the resource selector 112 may select the pooled resource(s) 106 to deliver QoS-sensitive services when the QoS-sensitive services are more likely to be delivered with a higher QoS over the pooled resource(s) 106 than the reserved resource(s) 108. For instance, the resource selector 112 may identify a congestion level of the pooled resource(s) 106 and/or the reserved resource(s) 108. When the resource selector 112 determines that the congestion level of the pooled resource(s) 106 is below a first congestion threshold and/or that the congestion level of the reserved resource(s) 108 is above a second congestion threshold, the resource selector 112 may select the pooled resource(s) 106 to deliver the QoS-sensitive services. Accordingly, the resource selector 112 may cause delivery of the QoS-sensitive services over a type of resource that maximizes QoS, even if that type of resource is a pooled resource.

In some examples, the resource selector 112 may identify a radio signal quality or signal strength (e.g., in decibel microvolts per meter (dBμV/m) or in decibels above a reference level of one milliwatt (dBm)) of a transmission between the first UE 102 and a RAN in the delivery network(s) 104. For instance, the resource selector 112 may determine a Received Signal Strength Indication (RSSI) associated with the first UE 102 and the RAN (e.g., when the resource selector 112 is part of the RAN) and/or receive the RSSI from the RAN. If the signal quality or signal strength is above a particular signal threshold, the resource selector 112 may select the pooled resource(s) to deliver the QoS-sensitive services.

In some cases, the resource selector 112 may select the pooled resource(s) 106 for QoS-sensitive services when such a selection prioritizes to data traffic being delivered to and from subscribers of the delivery network(s) 104. For example, if the resource selector 112 determines that the first UE 102 is subscribed to the delivery network(s) 104 (e.g., is associated with an account that is subscribed to a particular carrier associated with the delivery network(s) 104), the resource selector 112 may deliver the QoS-sensitive services over the reserved resource(s) 108. In contrast, if the resource selector 112 determines that the first UE 102 is roaming and the delivery network(s) 104 are visited network(s), the resource selector 112 may deliver the QoS-sensitive services over the pooled resource(s) 106.

In various examples, the resource selector 112 may select the pooled resource(s) 106 when the resource allocator 110 is unable to, or is delayed in, allocating the reserved resource(s) 108 for delivery of the QoS-sensitive services. In some cases, the resource selector 112 can account for instances in which at least one node in the delivery network(s) 104 does not support reserved resources. For example, the resource selector 112 may initiate a timer in response to requesting the resource allocator 110 to allocate the reserved resource(s) 108 to QoS-sensitive services. If the timer expires without the resource selector 112 having received a confirmation that the reserved resource(s) 108 have been allocated to the QoS-sensitive services, the resource selector 112 may initiate a fallback process by which the resource selector 112 selects the pooled resource(s) 106 for delivery of the QoS-sensitive services.

According to some implementations, the resource selector 112 may select the pooled resource(s) 106 to deliver non-emergency QoS-sensitive services. As used herein, the term "emergency services" can refer to E911 services. The resource selector 112 may determine that the QoS-sensitive services are non-emergency services. In response to determining that the QoS-sensitive services are non-emergency services, the resource selector 112 may select the pooled resource(s) 106 to deliver the QoS-sensitive services.

Figure 2:
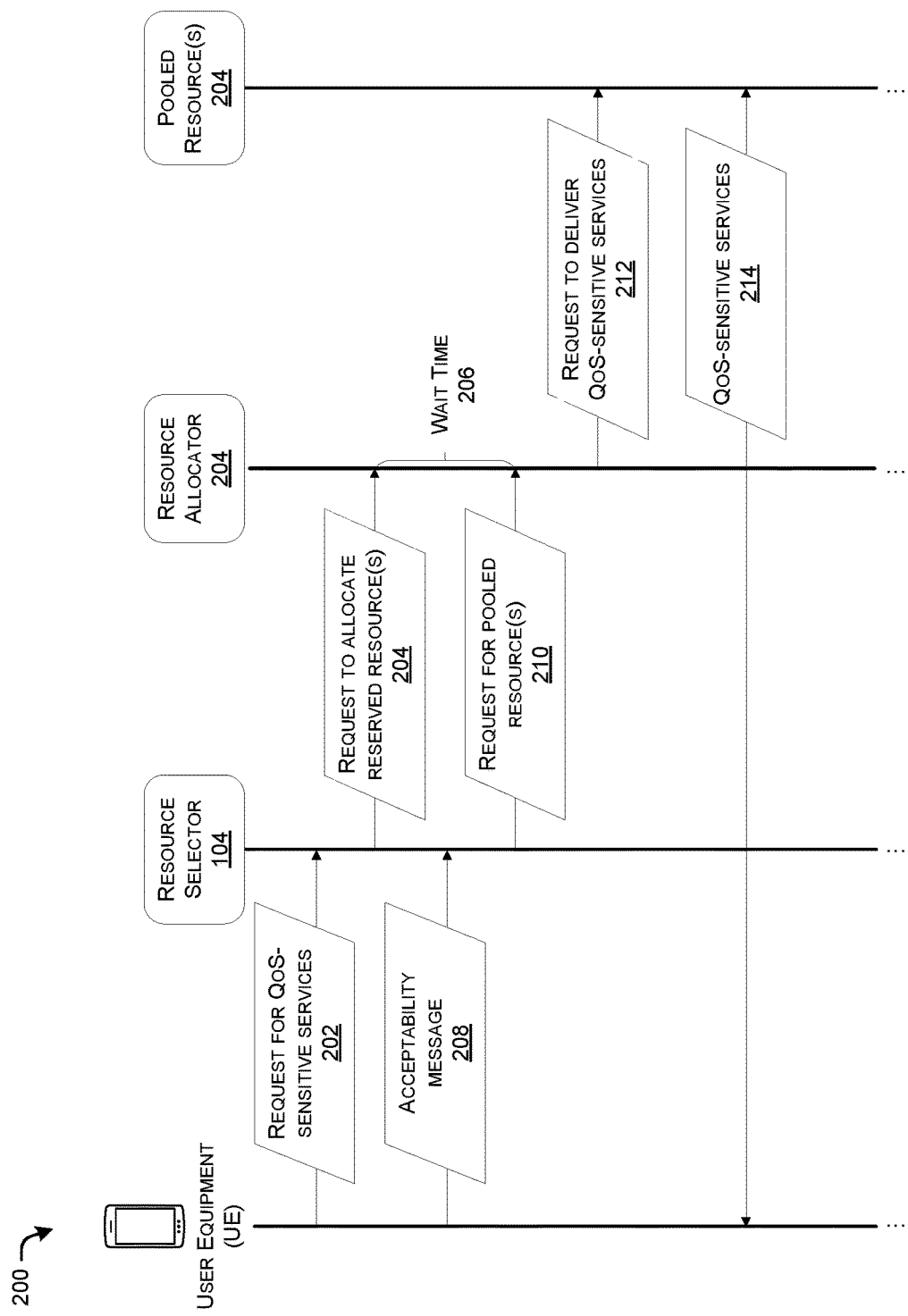
FIG. 2 illustrates example signaling for pooled resource fallback when a request to allocate reserved resources times out.

FIG. 2 illustrates example signaling 200 for pooled resource fallback when a request to allocate reserved resources times out. As illustrated, the signaling 200 can be performed using various elements described above with reference to FIG. 1, such as the first User Equipment (UE) 102, the at least one pooled resource 106, the resource selector 112, and the resource allocator 114.

The first UE 102 may transmit a request for Quality of Service (QoS)-sensitive services 202 to the resource selector 112. The request may be a request for Guaranteed Bit Rate (GBR) services, for example. In some cases, the request 202 indicates a QoS Class Identifier (QCI) (e.g., a $5^{th}$ Generation (5G) QoS Indicator (5QI)) corresponding to a service type of the requested services. In some instances, the resource selector 112 identifies the QCI based on the request for the QoS-sensitive services 202. For instance, the resource selector 112 may determine the service type and look up the QCI in a local database based on the service type. According to various implementations, the resource selector 112 may determine that the request 202 is for QoS-sensitive services based on the QCI of the requested services specified in the request for the QoS-sensitive services 202.

Although not illustrated in FIG. 2, in some cases, the request for QoS-sensitive services 202 may be transmitted to the resource selector 112 by a second UE (e.g., the second UE 114). That is, the second UE may initiate a communication session with the first UE 102.

The resource selector 112 may transmit a request to allocate at least one reserved resource 204 to the resource allocator 114. In various implementations, the request to allocate the reserved resource(s) 204 may specify the QCI of the requested services and/or an indication of the reserved resource(s). In response to transmitting the request to allocate the reserved resource(s) 204, the resource selector 112 may initiate a timer that counts down a wait time 206.

In various implementations the first UE 102 may transmit an acceptability message 208 to the resource selector 112. The acceptability message 208 may indicate that the first UE 102 will accept delivery of the QoS-sensitive services over one or more pooled resources. Although not illustrated in FIG. 2, in some cases, the request 202 may include the acceptability message 208. In various examples, the acceptability message 208 may be transmitted by the first UE 102 before the request to allocate the reserved resource(s) 204 is transmitted by the resource selector 112.

The wait time 206 may expire without the resource selector 112 having received a confirmation that the reserved resource(s) have been allocated by the resource allocator 114. This can be the result of various factors. For instance, the resource allocator 114 may not support the reserved resource(s). In some cases, the resource allocator 114 may be part of a delivery network that does not reserve resources for at least the QCI level of the requested services. In some cases, the reserved resource(s) may be significantly congested, causing delays in allocation of the reserved resource(s). For any of various reasons, the resource allocator 114 may not allocate the reserved resource(s) to the requested services.

In response to determining that the wait time 206 has expired, the resource selector 112 may transmit a request to allocate the pooled resource(s) 210 to the resource allocator 114. Despite the fact that QoS-sensitive services may generally be delivered over the reserved resource(s), the resource selector 112 may nevertheless select the pooled resource(s) for delivery of the requested services if the resource allocator 114 takes an inordinate time to allocate the reserved resource(s) to the requested services.

The resource allocator 114 may transmit, to one or more nodes associated with the pooled resource(s) 106, a request to deliver the QoS-sensitive services 212 via the pooled resource(s) 106. The request to deliver the QoS-sensitive services may include at least one of an indication of the first UE 102, an indication of another endpoint in a communication session through which the QoS-sensitive services are delivered (e.g., another UE or a content server), an indication of the type of services, routing information, or the like.

The pooled resource(s) 106 may deliver the QoS-sensitive services 214 to the first UE 102. In some cases, the delivery of the QoS-sensitive services 214 may include the transmission of uplink data from the first UE 102 to another entity via the pooled resource(s) 106, the transmission of downlink data from the other entity to the first UE via the pooled resource(s) 106, or a combination thereof.

Figure 3:
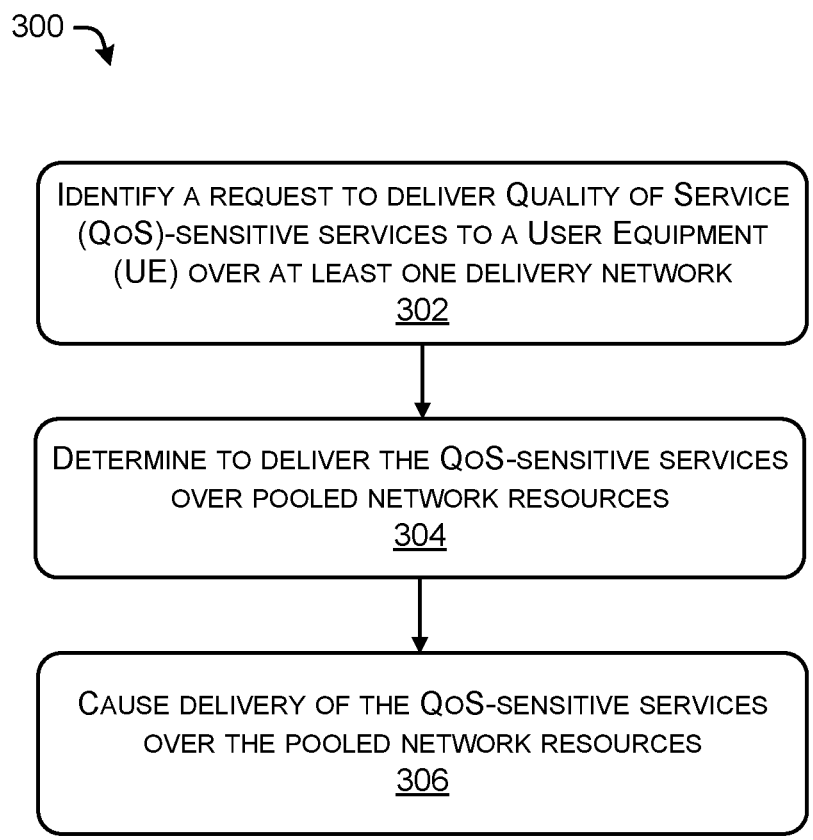
FIG. 3 illustrates an example process for delivering Quality of Service (QoS)-sensitive services over one or more pooled resources.
Figure 4:
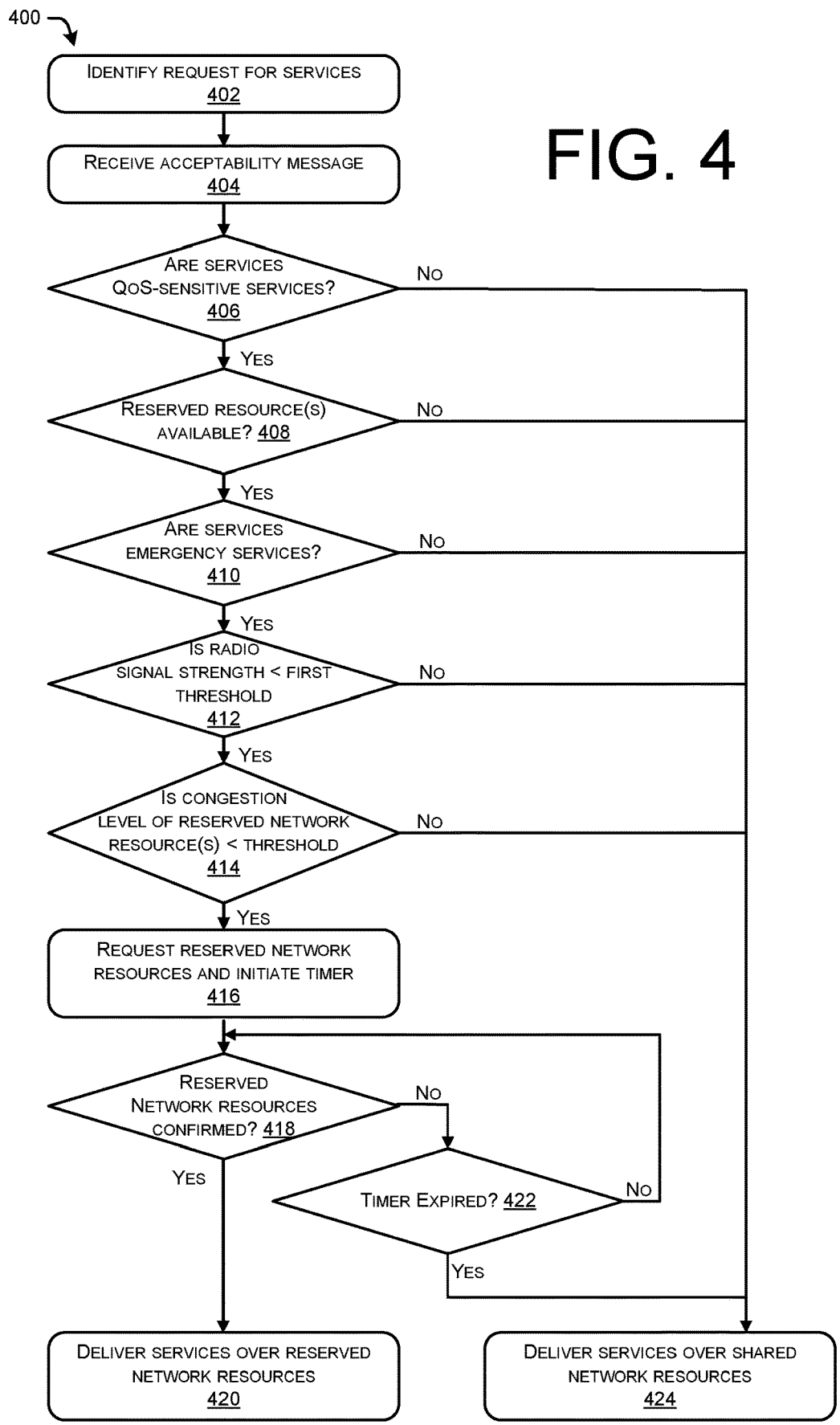
FIG. 4 illustrates an example process for allocating QoS-sensitive services to at least one pooled resource or at least one reserved resource based on various conditions.

FIGS. 3 and 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process 300 for delivering Quality of Service (QoS)-sensitive services over one or more pooled resources. In various implementations, the process 300 can be performed by a node in a delivery network, such as at least one of a Radio Access Network (RAN) (e.g., an eNodeB and/or a gNodeB), a node in a core network (e.g., in an Evolved Packet Core (EPC) and/or a 5$^{th}$ Generation (5G) core network), a resource selector (e.g., the resource selector 112), a resource allocator (e.g., the resource allocator 110), or any combination thereof.

At 302, a request to deliver QoS-sensitive services over at least one delivery network to a User Equipment (UE) may be identified. In some cases, the request may be received from the UE or from another device requesting delivery of the QoS-sensitive services to the UE. A QoS Class Indicator (QCI) may be identified for the requested services, and the QCI may be determined to correspond to QoS-sensitive services. In some examples, the QoS-sensitive services may be associated with a Guaranteed Bit Rate (GBR). For instance, the QoS-sensitive services may be conversational voice services.

At 304, the process 300 includes determining to deliver the QoS-sensitive services over at least one pooled resource. In some cases, the UE may indicate (e.g., by transmitting an acceptability message) that pooled network delivery is acceptable. As a default rule, the QoS-sensitive services may be delivered over at least one reserved resource. However, in the example depicted in FIG. 3, at least one of the following factors may be determined to apply:

a. The reserved resource(s) are unavailable and/or unsupported by the delivery network(s)

b. The requested QoS-sensitive services are non-emergency services c. A signal strength of a wireless signal between the UE and a RAN in the delivery network(s) is greater than a threshold signal strength (e.g., −100 dBm)

d. A congestion level of the reserved resource(s) is greater than a first congestion threshold (e.g., 50% occupied bandwidth of the reserved resource(s))

e. A congestion level of the pooled resource(s) is less than a second congestion threshold (e.g., 50% occupied bandwidth of the pooled resource(s))

f. An available capacity (or bandwidth) of the reserved resource(s) is less than a first capacity threshold (e.g., 50% unoccupied bandwidth of the reserved resource(s))

g. An available capacity (or bandwidth) of the pooled resource(s) is greater than a second capacity threshold (e.g., 50% unoccupied bandwidth of the pooled resource(s))

h. A wait time, initiated when a request to allocate the reserved resource(s) is transmitted, has expired (e.g., a wait time of 10 milliseconds)

i. A user of the UE is unsubscribed to the delivery network(s) and/or a carrier of the delivery network(s)

At 306, the process 300 includes causing the QoS-sensitive services to be delivered over the pooled resource(s). In various implementations, at least a portion of the pooled resource(s) may be allocated for delivery of the QoS-sensitive services. Various non-QoS-sensitive services (e.g., internet browsing services) may also be allocated to the pooled resource(s). In some cases, a QoS of the QoS-sensitive services may be improved when they are delivered over the pooled resource(s). In some implementations, resources in the delivery network(s) may be efficiently allocated based on real-time conditions of the delivery network(s), the UE, or the like.

FIG. 4 illustrates an example process 400 for allocating Quality of Service (QoS)-sensitive services to at least one pooled resource or at least one reserved resource based on various conditions. In various implementations, the process 400 can be performed by a node in a delivery network, such as at least one of a Radio Access Network (RAN) (e.g., an eNodeB and/or a gNodeB), a node in a core network (e.g., in an Evolved Packet Core (EPC) and/or a 5$^{th}$ Generation (5G) core network), a resource selector (e.g., the resource selector 112), a resource allocator (e.g., the resource allocator 110), or any combination thereof.

At 402, a request for services may be identified. The request may be a request to provide services to a User Equipment (UE). In some cases, the request may be received from the UE, or from another device requesting to establish a communication session with the UE.

At 404, an acceptability message may be received from the UE. The acceptability message may indicate that delivery of QoS-sensitive services over one or more pooled network resource(s) (e.g., a default bearer, a default 5G QoS Indicator (5QI) flow, or the like) is acceptable to the UE.

At 406, the process 400 may include determining whether the requested services are QoS-sensitive services. In some cases, a QoS Class Identifier (QCI) is identified for the services based on the request.

If the requested services are determined to be QoS-sensitive services at 406, the process 400 may proceed to 408. At 408, the process 400 may include determining whether a user associated with the UE is a subscriber to the delivery network(s). For instance, the user may be determined to be, or not to be, a subscriber of a carrier associated with the delivery network(s).

If the user is determined to be a subscriber at 408, the process 400 may proceed to 410. At 410, the process 400 may include determining whether a signal strength of a radio signal transmitted between the UE and the RAN is less than a first threshold. The first threshold may be a predetermined signal strength. In some cases, the first threshold may be 50% of a signal strength of the radio signal as it is transmitted.

If the signal strength is determined to be less than the first threshold at 410, the process 400 may proceed to 412. At 412, the process 400 includes determining whether a congestion level of at least one reserved resource is below a second threshold. The congestion level may be determined by various techniques, such as measuring a throughput through the reserved resource(s), a Packet Error Rate (PER) of data packets transmitted through the reserved resource(s), or the like. In some cases, the second threshold may correspond to a particular throughput rate, a particular PER, or the like. In some cases, the second threshold can correspond to an available bandwidth of 50% in the reserved resource(s)

If the congestion level is determined to be below the second threshold at 412, the process 400 may proceed to 414. At 414, the reserved resource(s) may be requested. In addition, a timer may be initiated at 414. The timer may be initialized to count a wait time. AN example of a length of the wait time is 10 milliseconds. In some cases, the reserved resource(s) may be requested by transmitting a request to allocate the reserved resource(s) to the requested services. In some cases, the request may be transmitted to a resource allocator.

At 418, the process 400 may include determining whether the reserved resource(s) have been confirmed. For instance, 418 may include determining whether a response to the request to allocate the reserved resource(s) has been received (e.g., from the resource allocator).

If the reserved resource(s) have been confirmed at 418, the process 400 may proceed to 420. At 420, the QoS-sensitive services may be delivered over the reserved resource(s). For instance, the QoS-sensitive services may be delivered over a dedicated bearer, a dedicated 5QI flow, or the like, through the delivery network(s).

If, however, the reserved resource(s) have not been confirmed at 418, the process 400 proceeds to 422. At 422, the process 400 includes determining whether the timer has expired. For instance, 422 may include determining whether a time interval that is greater than the wait time has occurred since the transmission of the request.

If the timer is determined to have not expired at 422, the process 400 may proceed back to 418. However, if the timer is determined to have expired at 422, the process 400 proceeds to 424. At 424, the QoS-sensitive services may be delivered over the pooled resource(s). For instance, the QoS-sensitive services may be delivered over a default barer, a default 5QI flow, or the like.

Further, in the example process 400, if at least one of (i) the services are determined to be non-QoS services at 406, (ii) the user is determined to not be a subscriber at 408, (iii) the signal strength is determined to not be less than the first threshold at 410, or (iv) the congestion level of the reserved resource(s) is determined to not be less than the second threshold at 412, the process 400 may proceed to 424. Accordingly, in any of these circumstances, the requested services may be delivered over pooled resource(s).

FIG. 5 illustrates example devices 500 configured to intelligently allocate services to at least one reserved resource and/or at least one pooled resource in one or more delivery networks. In some embodiments, some or all of the functionality discussed in connection with FIGS. 1-4 can be implemented in the device(s) 500. Further, the device(s) 500 can be implemented as one or more server computers, at least one network element on a dedicated hardware, as at least one software instance running on a dedicated hardware, or as at least one virtualized function instantiated on an appropriate platform, such as a cloud infrastructure, and the like. It is to be understood in the context of this disclosure that the device(s) 500 can be implemented as a single device or as a plurality of devices with components and data distributed among them.

As illustrated, the device(s) 500 can include a Radio Access Network (RAN) 502 and one or more core networks 504. The RAN 502 may comprise, for instance, an eNodeB, a gNodeB, or any other device configured to transmit and/or receive data wirelessly from an external device (e.g., a User Equipment (UE). The RAN 502 may include one or more radio devices 504. The radio device(s) 504 can comprise a memory 506. In various embodiments, the memory 504 is volatile (including a component such as Random Access Memory (RAM)), non-volatile (including a component such as Read Only Memory (ROM), flash memory, etc.) or some combination of the two.

The memory 506 may include various components, such as the resource selector 112 described above. The resource selector 112 can comprise methods, threads, processes, applications, or any other sort of executable instructions. The resource selector 112, and various other elements stored in the memory 506 can also include files and databases.

The memory 506 may include various instructions (e.g., instructions in the resource selector 112), which can be executed by at least one processor 508 to perform operations. In some embodiments, the processor(s) 508 includes a Central Processing Unit (CPU), a Graphics Processing Unit (GPU), or both CPU and GPU, or other processing unit or component known in the art.

The radio device(s) 504 can also include additional data storage devices (removable and/or non-removable) such as, for example, magnetic disks, optical disks, or tape. Such additional storage can include removable storage 510 and non-removable storage 512. Tangible computer-readable media can include volatile and nonvolatile, removable and non-removable media implemented in any method or technology for storage of information, such as computer readable instructions, data structures, program modules, or other data. The memory 506, removable storage 510, and non-removable storage 512 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the radio device(s) 504. Any such tangible computer-readable media can be part of the radio device(s) 504.

The radio device(s) 504 also can include input device(s) 514, such as a keypad, a cursor control, a touch-sensitive display, voice input device, etc., and output device(s) 516 such as a display, speakers, printers, etc. These devices are well known in the art and need not be discussed at length here. In particular implementations, a user can provide input to the radio device(s) 504 via a user interface associated with the input device(s) 514 and/or the output device(s) 516.

The radio device(s) 504 can also include one or more wired or wireless transceiver(s) 518. For example, the transceiver(s) 518 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 518 can utilize Multiple-Input/Multiple-Output (MIMO) technology. The transceiver(s) 518 can include any sort of wireless transceivers capable of engaging in wireless, Radio Frequency (RF) communication. The transceiver(s) 518 can also include other wireless modems, such as a modem for engaging in Wi-Fi, WiMAX, Bluetooth, or infrared communication.

In some implementations, the transceiver(s) 518 can be used to communicate between various functions, components, modules, or the like, that are comprised in the radio device(s) 504. For instance, the transceiver(s) 518 can be used to transmit data between the resource selector 112 and an external UE, between the resource selector 112 and one or more core devices 520, or the like.

The core device(s) 520 may comprise one or more servers 540 including the core network(s). In various examples, the core network(s) can include at least one of a 2G core network, a 3G core network, a 4G core network (e.g., an Evolved Packet Core (EPC)), or a 5G core network. For instance, the core network(s) may include a 5G core network.

The core device(s) 520 can comprise a memory 524. In various embodiments, the memory 524 is volatile (including a component such as Random Access Memory (RAM)), non-volatile (including a component such as Read Only Memory (ROM), flash memory, etc.) or some combination of the two.

The memory 524 may include various components, such as the resource selector 112 and/or the resource allocator 114 described above. The resource selector 112 and/or the resource allocator 114 can comprise methods, threads, processes, applications, or any other sort of executable instructions. The resource selector 112, the resource allocator 114, and various other elements stored in the memory 524 can also include files and databases.

The memory 506 may include various instructions (e.g., instructions in the resource selector 112), which can be executed by at least one processor 508 to perform operations. In some embodiments, the processor(s) 508 includes a CPU, a GPU, or both CPU and GPU, or other processing unit or component known in the art.

The core device(s) 520 can also include additional data storage devices (removable and/or non-removable) such as, for example, magnetic disks, optical disks, or tape. Such additional storage can include removable storage 526 and non-removable storage 528. Tangible computer-readable media can include volatile and nonvolatile, removable and non-removable media implemented in any method or technology for storage of information, such as computer readable instructions, data structures, program modules, or other data. The memory 524, removable storage 526, and non-removable storage 528 are all examples of computer-readable storage media. Computer-readable storage media include, but are not limited to, RAM, ROM, EEPROM, flash memory or other memory technology, CD-ROM, DVDs, CAM, or other optical storage, magnetic cassettes, magnetic tape, magnetic disk storage or other magnetic storage devices, or any other medium which can be used to store the desired information and which can be accessed by the core device(s) 520. Any such tangible computer-readable media can be part of the core device(s) 520.

The core device(s) 520 also can include input device(s) 530, such as a keypad, a cursor control, a touch-sensitive display, voice input device, etc., and output device(s) 532 such as a display, speakers, printers, etc. These devices are well known in the art and need not be discussed at length here. In particular implementations, a user can provide input to the core device(s) 520 via a user interface associated with the input device(s) 530 and/or the output device(s) 532.

The core device(s) 520 can also include one or more wired or wireless transceiver(s) 534. For example, the transceiver(s) 534 can include a NIC, a network adapter, a LAN adapter, or a physical, virtual, or logical address to connect to the various base stations or networks contemplated herein, for example, or the various user devices and servers. To increase throughput when exchanging wireless data, the transceiver(s) 534 can utilize MIMO technology. The transceiver(s) 534 can include one or more wireless transceivers capable of engaging in wireless, RF communication. The transceiver(s) 534 can also include other wireless modems, such as a modem for engaging in Wi-Fi, WiMAX, Bluetooth, or infrared communication.

In some implementations, the transceiver(s) 534 can be used to communicate between various functions, components, modules, or the like, that are comprised in the radio device(s) 500. For instance, the transceiver(s) 534 can be used to transmit data between the resource selector 112 and the resource allocator 114, between the resource selector 112 and radio device(s) 520, between the radio device(s) and another network (e.g., an IP Multimedia Subsystem (IMS) network, data network, etc.), or the like.

Example Clauses

The following example clauses relate to various implementations of the present disclosure:

A. A method, including: identifying a request to deliver Quality of Service (QoS)-sensitive services to a User Equipment (UE) over at least one 5th Generation (5G) network, the at least one 5G network comprising a reserved resource and a pooled resource; determining that a first congestion level of the reserved resource is above a first threshold level; determining that a second congestion level of the pooled resource is below a second threshold level; and causing delivery of the QoS-sensitive services over the pooled resource.

B. The method of clause A, wherein the at least one 5G network comprises a 5G Radio Access Network (RAN) and a 5G core network.

C. The method of clause A or B, further including: identifying a first 5G QoS Indicator (5QI) associated with the QoS-sensitive services, wherein the pooled resource is associated with a second 5QI that is different than the first 5QI, the second 5QI having at least one of a lower priority level, a greater packet delay budget, or a higher packet error rate than the first 5QI.

D. The method of any of clauses A to C, further including: determining that a strength of a radio signal transmitted between the UE and a 5G Radio Access Network (RAN) is above a third threshold.

E. The method of any of clauses A to D, further including: transmitting, to a resource allocator in the at least one 5G network, a second request to allocate the reserved resource to the QoS-sensitive services; and determining that a wait time has expired without having received a response to the second request.

F. A method, including: identifying a request to deliver Quality of Service (QoS)-sensitive services to a User Equipment (UE) over at least one delivery network, the at least one delivery network including at least one reserved resource and at least one pooled resource; determining to deliver the QoS-sensitive services over the at least one pooled resource; and causing delivery of the QoS-sensitive services over the at least one pooled resource.

G. The method of clause F, wherein the at least one reserved resource and the QoS-sensitive services are associated with at least one of a first priority level, a first packet delay budget, a first maximum packet error rate, or a first Guaranteed Bit Rate (GBR), and wherein the at least one pooled resource is associated with at least one of a second priority level that is lower than the first priority level, a second packet delay budget that is greater than the first packet delay budget, a second maximum packet error rate that is greater than the first maximum packet error rate, or a second GBR that is lower than the first GBR.

H. The method of clause F or G, wherein determining to deliver the QoS-sensitive services over the at least one pooled resource includes: determining that the QoS-sensitive services are non-emergency services.

I. The method of any of clauses F to H, wherein determining to deliver the QoS-sensitive services over the at least one pooled resource includes: determining that a strength of a radio signal transmitted between a Radio Access Network (RAN) in the at least one delivery network and the UE is above a threshold.

J. The method of any of clauses F to I, wherein determining to deliver the QoS-sensitive services over the pooled resource includes: determining that a first congestion level of the at least one reserved resource is below a first threshold level; and determining that a second congestion level of the at least one pooled resource is above a second threshold level.

K. The method of any of clauses F to J, the request being a first request, wherein determining to deliver the QoS-sensitive services over the at least one pooled resource includes: transmitting, to a resource allocator in the at least one delivery network, a second request to allocate the at least one reserved resource to the QoS-sensitive services; and determining that a wait time has expired without having received a response to the second request.

L. The method of any of clauses F to K, wherein the at least one delivery network comprises at least one of a 5th Generation (5G) Radio Access Network (RAN) or a 5G core network.

M. A system, including: at least one processor; and memory storing instructions that, when executed by the at least processor, cause the at least one processor to perform operations including: identifying a request to deliver Quality of Service (QoS)-sensitive services to a User Equipment (UE) over at least one delivery network, the at least one delivery network including at least one reserved resource and at least one pooled resource; determining to deliver the QoS-sensitive services over the at least one pooled resource; and causing delivery of the QoS-sensitive services over the at least one pooled resource.

N. The system of clause M, wherein the at least one reserved resource and the QoS-sensitive services are associated with at least one of a first priority level, a first packet delay budget, a first maximum packet error rate, or a first Guaranteed Bit Rate (GBR), and wherein the at least one pooled resource is associated with at least one of a second priority level that is lower than the first priority level, a second packet delay budget that is greater than the first packet delay budget, a second maximum packet error rate that is greater than the first maximum packet error rate, or a second GBR that is lower than the first GBR.

O. The system of clause M or N, wherein determining to deliver the QoS-sensitive services over the at least one pooled resource includes: determining that the QoS-sensitive services are non-emergency services.

P. The system of any of clauses M to O, wherein determining to deliver the QoS-sensitive services over the at least one pooled resource includes: determining that a strength of a radio signal transmitted between a Radio Access Network (RAN) in the at least one delivery network and the UE is above a threshold.

Q. The system of any of clauses M to P, wherein determining to deliver the QoS-sensitive services over the at least one pooled resource includes: determining that a first congestion level of the at least one reserved resource is below a first threshold level; and determining that a second congestion level of the at least one pooled resource is above a second threshold level.

R. The system of any of clauses M to Q, the request being a first request, wherein determining to deliver the QoS-sensitive services over the at least one pooled resource includes: transmitting, to a resource allocator in the at least one delivery network, a second request to allocate the at least one reserved resource to the QoS-sensitive services; and determining that a wait time has expired without having received a response to the second request.

S. The system of any of clauses M to R, wherein the at least one delivery network includes at least one of a 5th Generation (5G) Radio Access Network (RAN) or a 5G core network.

T. The system of claim S, wherein the system is comprised in at least one of the 5G RAN or the 5G core network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   identifying a request to deliver Quality of Service (QOS)-sensitive services to a User Equipment (UE) over at least one $5^{th}$ Generation (5G) network, the at least one 5G network comprising a reserved resource and a pooled resource;
   in response to determining at least one of: (A) that reserved resources are available for the QoS-sensitive services, (B) that the QoS-sensitive services are emergency services, (C) that a radio signal strength is below a first threshold, or (D) that a congestion level of the reserved resources is below a second threshold,
   transmitting, to a resource allocator in the at least one 5G network, a second request to allocate the reserved resource to the QoS-sensitive services, and
   initiating a timer; and
   receiving a response to the second request before an expiration of the timer, and, based on the response to the second request, causing delivery of the QoS-sensitive services over the reserved resource.

2. The method of claim 1, wherein the at least one 5G network comprises a 5G Radio Access Network (RAN) and a 5G core network.

3. The method of claim 1, further comprising:
   identifying a first 5G QoS Indicator (5QI) associated with the QoS-sensitive services,
   wherein the pooled resource is associated with a second 5QI that is different than the first 5QI, the second 5QI having at least one of a lower priority level, a greater packet delay budget, or a higher packet error rate than the first 5QI.

4. The method of claim 1, further comprising:
   determining that a strength of a radio signal transmitted between the UE and a 5G Radio Access Network (RAN) is above a third threshold.

5. The method of claim 1, further comprising:
   receiving an acceptability message indicating that delivery of the QoS-sensitive services to a UE is acceptable to the UE.

6. A method, comprising:
   identifying a request to deliver Quality of Service (QOS)-sensitive services to a User Equipment (UE) over at least one delivery network, the at least one delivery network comprising at least one reserved resource and at least one pooled resource;
   in response to determining at least one of: (A) that reserved resources are available for the QoS-sensitive services, (B) that the QoS-sensitive services are emergency services, (C) that a radio signal strength is below a first threshold, or (D) that a congestion level of the reserved resources is below a second threshold,
   transmitting, to a resource allocator in the at least one delivery network, a second request to allocate the reserved resource to the QoS-sensitive services, and initiating a timer; and
   in response to expiration of the timer, if no response to the second request, allocating the reserved resource to the QoS-sensitive services, has been received, causing delivery of the QoS-sensitive services over the at least one pooled resource.

7. The method of claim 6, wherein the at least one reserved resource and the QoS-sensitive services are associated with at least one of a first priority level, a first packet delay budget, a first maximum packet error rate, or a first Guaranteed Bit Rate (GBR), and
   wherein the at least one pooled resource is associated with at least one of a second priority level that is lower than the first priority level, a second packet delay budget that is greater than the first packet delay budget, a second maximum packet error rate that is greater than the first maximum packet error rate, or a second GBR that is lower than the first GBR.

8. The method of claim 6, wherein determining to deliver the QoS-sensitive services over the at least one pooled resource comprises:
   determining that the QoS-sensitive services are non-emergency services.

9. The method of claim 6, wherein determining to deliver the QoS-sensitive services over the at least one pooled resource comprises:
   determining that a strength of a radio signal transmitted between a Radio Access Network (RAN) in the at least one delivery network and the UE is above a threshold.

10. The method of claim 6, wherein determining to deliver the QoS-sensitive services over the pooled resource comprises:
    determining that a first congestion level of the at least one reserved resource is below a first threshold level; and
    determining that a second congestion level of the at least one pooled resource is above a second threshold level.

11. The method of claim 6, further comprising:
    receiving an acceptability message indicating that delivery of the QoS-sensitive services to a UE is acceptable to the UE.

12. The method of claim 6, wherein the at least one delivery network comprises at least one of a $5^{th}$ Generation (5G) Radio Access Network (RAN) or a 5G core network.

13. A system, comprising:
    at least one processor; and
    memory storing instructions that, when executed by the at least processor, cause the at least one processor to perform operations comprising:
    identifying a request to deliver Quality of Service (QOS)-sensitive services to a User Equipment (UE) over at least one delivery network, the at least one delivery network comprising at least one reserved resource and at least one pooled resource;
    in response to determining at least one of: (A) that reserved resources are available for the QoS-sensitive services, (B) that the QoS-sensitive services are emergency services, (C) that a radio signal strength is below a first threshold, or (D) that a congestion level of the reserved resources is below a second threshold, transmitting, to a resource allocator in the at least one delivery network, a second request to allocate the reserved resource to the QoS-sensitive services, and initiating a timer;

when a response to the second request is received before an expiration of the timer, causing, based on the response to the second request, delivery of the QoS-sensitive services over the at least one reserved resource; and when, in response to expiration of the timer, no response to the second request, allocating the reserved resource to the QoS-sensitive services, has been received, causing delivery of the QoS-sensitive services over the at least one pooled resource.

14. The system of claim 13, wherein the at least one reserved resource and the QoS-sensitive services are associated with at least one of a first priority level, a first packet delay budget, a first maximum packet error rate, or a first Guaranteed Bit Rate (GBR), and wherein the at least one pooled resource is associated with at least one of a second priority level that is lower than the first priority level, a second packet delay budget that is greater than the first packet delay budget, a second maximum packet error rate that is greater than the first maximum packet error rate, or a second GBR that is lower than the first GBR.

15. The system of claim 13, wherein determining to deliver the QoS-sensitive services over the at least one pooled resource comprises:

determining that the QoS-sensitive services are non-emergency services.

16. The system of claim 13, wherein determining to deliver the QoS-sensitive services over the at least one pooled resource comprises:

determining that a strength of a radio signal transmitted between a Radio Access Network (RAN) in the at least one delivery network and the UE is above a threshold.

17. The system of claim 13, wherein determining to deliver the QoS-sensitive services over the at least one pooled resource comprises:

determining that a first congestion level of the at least one reserved resource is below a first threshold level; and determining that a second congestion level of the at least one pooled resource is above a second threshold level.

18. The system of claim 13, wherein the operations further comprise:

receiving an acceptability message indicating that delivery of the QoS-sensitive services to a UE is acceptable to the UE.

19. The system of claim 13, wherein the at least one delivery network comprises at least one of a $5^{th}$ Generation (5G) Radio Access Network (RAN) or a 5G core network.

20. The system of claim 19, wherein the system is comprised in at least one of the 5G RAN or the 5G core network.

* * * * *